United States Patent [19]
Randall

[11] 3,843,684
[45] Oct. 22, 1974

[54] ALPHA, OMEGA-PYRROLIDONYL POLYACROLEIN

[75] Inventor: David Irwin Randall, Easton, Pa.
[73] Assignee: GAF Corporation, New York, N.Y.
[22] Filed: Feb. 16, 1972
[21] Appl. No.: 226,983

[52] U.S. Cl................. 260/326.25, 424/274, 71/95
[51] Int. Cl............................................ C07d 27/08
[58] Field of Search..................... 260/326.3, 326.25

[56] References Cited
OTHER PUBLICATIONS
Field et al., Chem. Abs., Vol. 74, 59362a, (1971), Abs. of Ger. Offen., 2,006,710.

*Primary Examiner*—Joseph A. Narcavage
*Attorney, Agent, or Firm*—Walter C. Kehm; Samson B. Leavitt

[57] ABSTRACT

A new composition of matter comprising α, ω-pyrrolidonyl polyacrolein.

3 Claims, No Drawings

ALPHA, OMEGA-PYRROLIDONYL POLYACROLEIN

The instant invention relates to new polymeric materials and to their preparation. In particular, the instant invention relates to a new composition of matter comprising $\alpha, \omega$-pyrrolidonyl polyacrolein.

Polyacrolein has been prepared in the past by free radical polymerization processes such as are described in Acrolein, Smith, C. W., John Wiley & Sons, Inc., N.Y. (1962) page 225, and Kinetics and Mechanisms of Polymerization, Ham, G. E., M. Decker, N.Y. Volume 1, Part 1 - Vinyl Polymerization, (1967) page 410. It is also known that unstabilized acrolein spontaneously polymerizes upon standing to produce a solid, non-fusible and insoluble product which has been designated as "disacryl." (Redtenbacher, Liebigs Ann. Chem. 47 (1843), p. 113.)

The usefulness of polyacrolein has been somewhat hampered in that there have been certain difficulties associated with the handling of the same. Particularly, it has been found to be difficult to effect the solution of polyacrolein while simultaneously maintaining its high molecular weight and aldehyde functionality. Thus, U.S. Pat. No. 3,235,524 teaches that high molecular weight free radical polymerized acrolein is insoluble in all common organic solvents. The patent teaches that a macromolecular infusible insoluble homopolymer of acrolein which is substantially devoid of free aldehyde groups may be converted into the soluble product by reaction with sulfuric acid at elevated temperatures. The quantity of acid employed in the reaction is sufficient to effect dissolution of the reaction product.

Recently, it has been found that normally insoluble polyacrolein may be made soluble at room temperature in polar organic solvents such as dimethyl formamide by reacting the polyacrolein with pyrrolidone. The solubility of the resultant product is attributed to the formation of a new product, namely, pyrrolidonyl polyacrolein material. The solution appears to occur without appreciable reduction in the molecular weight of the polyacrolein. The aldehyde function is still present as is evidenced by its rapid reaction with aqueous $SO_2$ or sodium bisulfite to form new bisulfite addition products. The average empirical formula of pyrrolidonyl polyacrolein has a ratio of acrolein units to pyrrolidonyl units of from about 7:1 to 3:1.

It is an object of the instant invention to provide new polymeric derivatives of acrolein.

Another object of the instant invention is to provide soluble polymer derivatives of acrolein.

Yet another object of the instant invention is to provide new soluble polymeric derivatives of acrolein which are particularly adapted for use as fungicides and herbicides.

These and other objects of the instant invention will become apparent from a consideration of the following detailed description.

It has now been discovered that novel water-soluble pyrrolidonyl and polyacroleins are obtained by reacting acrolein and pyrrolidone in the presence of a basic catalyst.

It has been established that the polymers of the invention are composed of a low molecular weight polymer of acrolein; the acrolein molecules being joined together via oxygen carbon bonds, the polymer molecule being terminated at each end thereof by a pyrrolidone group. The reaction mechanisms involved in the polymer structure can be seen from the following equation.

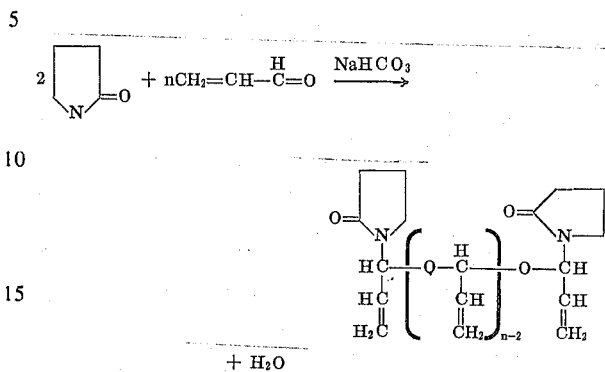

wherein n has a value of from 3 – 25 and preferably amounts to about 12.

It is to be understood that the formula as above stated generally represents the molecular structure of the water-soluble polymers of the invention. Some molecules are, of course, larger while others are smaller; the average polymer molecule containing about 12 molecules of acrolein.

A basic catalyst is necessary in order for the reaction to take place. Analysis by infra red technique shows carbonyl absorption to be absent, i.e., the aldehyde function is absent. The vinyl group is present and has not been affected by the reaction. This latter finding has been demonstrated by both IR and MR analysis. The polymer is conveniently isolated in the form of a viscous pyrrolidone solution. Removal of the pyrrolidone by the addition of benzene, in which solvent the polymer is insoluble, results in the formation of a white solid having the properties as above stated. On heating, the polymer undergoes decomposition.

Other basic catalysts which can be utilized in the reaction of the invention in addition to $NaHCO_3$ include potassium bicarbonate, potassium carbonate, sodium carbonate, KOH, NaOh, tertiary organic amines and ammonia. Stronger bases such as NaOH, KOH and the like, however, are somewhat less desirable inasmuch as their use results in a more or less highly-colored product. If a basic catalyst is not used, then the reaction proceeds extremely slowly and the yields are very poor. The reaction is advantageously conducted at a temperature of from 70° to 90°C. and preferably at a temperature of from 70° to 80°C. Temperatures of less than 60°C. are not as desirable in view of the decreased yields and slower reaction times. Larger amounts of acrolein can be employed whereby proportionately greater quantities of acrolein will be introduced into the molecule. However, viscosities are thereby increased and the reaction mass becomes intractable and insoluble.

The novel polymers of the invention have been found to be capable of killing certain fungi, particularly those responsible for slime formation. Acrolein possesses this property also, however, acrolein is itself extremely lachrymatory and its use is thereby severely limited. The present polymers have a broader range of utility inasmuch as their lachrymatory power is slight as compared to that of acrolein. The polymers of the invention have also proved effective as aquatic herbicides.

The following example illustrates the procedure for preparing the polymers of the invention, although the inclusion of such example is not to be taken as limiting or as otherwise encompassing any restriction on the invention.

EXAMPLE 1

340 g. of pyrrolidone and 0.50 g. of anhydrous $Na_2CO_3$ were heated to 70° – 80°C. 220 g. freshly distilled acrolein stabilized with hydroquinone monomethyl ether were then added to the reaction mixture. An exothermic reaction thereupon took place. Occasional cooling with an ice bath was necessary in order to maintain the temperature at from 70° – 80°C. The acrolein was added over a period of 2 ½ hours. After the addition had been completed, the rather viscous low-yield solution which had been formed was heated at 70° – 80°C. for an additional 3 hours and then cooled to room temperature. The polymer solution which was thereby obtained was very thick and almost glassy in nature and had to be warmed to above 60°C. in order for it to pour readily. The polymer solution was water-soluble at room temperature. Substantially, no acrolein odor was discernible. Excess volatile material was removed under vacuum at 80°C. in a flash evaporator. The total weight of the product recovered amounted to 551 g. amounting to approximately 100 percent yield.

The compounds of the invention have proved particularly valuable for combating fungi and particularly those responsible for slime formation. In this connection, in view of the absence of lachrymatory effects, the advantage over acrolein which has pronounced lachrymatory activity is apparent.

I claim:

1. A polymer having the following structural formula:

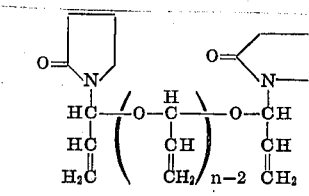

wherein n has a value of from 3 – 25.

2. A polymer as defined in claim 1 wherein $n$ has a value of 12.

3. A method of preparing the polymer defined in claim 1 comprising contacting two moles of pyrrolidone with n moles of acrolein, n having a value of 3 to 25, in the presence of a basic catalyst selected from the group consisting of potassium bicarbonate, sodium bicarbonate, potassium carbonate, sodium carbonate, potassium hydroxide, sodium hydroxide, ammonia, and tertiary organic amines at a temperature of from 60° to 90°C.

* * * * *